(12) United States Patent
Enoki et al.

(10) Patent No.: US 7,217,817 B1
(45) Date of Patent: May 15, 2007

(54) AGAROBIOSE-CONTAINING COMPOSITION

(75) Inventors: Tatsuji Enoki, Shiga (JP); Hiroaki Sagawa, Shiga (JP); Takeshi Sakai, Aomori (JP); Haruo Oyashiki, Shiga (JP); Hitoshi Sakakibara, Saitama (JP); Kazuyori Ochiai, Shiga (JP); Ikunoshin Kato, Kyoto (JP)

(73) Assignee: Takara Bio Inc., Shiga (JP)

( * ) Notice: Subject to any disclaimer, the term of this patent is extended or adjusted under 35 U.S.C. 154(b) by 0 days.

(21) Appl. No.: 09/979,003

(22) PCT Filed: May 8, 2000

(86) PCT No.: PCT/JP00/02921

§ 371 (c)(1),
(2), (4) Date: Nov. 14, 2001

(87) PCT Pub. No.: WO00/69285

PCT Pub. Date: Nov. 23, 2000

(30) Foreign Application Priority Data

May 14, 1999 (JP) ................................. 11-134850
Jul. 14, 1999 (JP) ................................. 11-200424
Feb. 1, 2000 (JP) ............................ 2000-024289

(51) Int. Cl.
*C08B 37/12* (2006.01)
*A61K 31/729* (2006.01)

(52) U.S. Cl. ................ 536/124; 536/123.1; 536/123.13

(58) Field of Classification Search ............. 536/123.1, 536/123.13, 124; 426/442, 658
See application file for complete search history.

(56) References Cited

U.S. PATENT DOCUMENTS

| | | | |
|---|---|---|---|
| 5,232,733 A | | 8/1993 | Resmer |
| 5,502,181 A | | 3/1996 | Kojima et al. |
| 5,690,981 A | * | 11/1997 | Watanabe et al. ........... 426/531 |
| 6,322,814 B1 | * | 11/2001 | Miller ......................... 424/484 |
| 6,475,990 B1 | * | 11/2002 | Enoki et al. .................. 514/23 |

FOREIGN PATENT DOCUMENTS

| | | | |
|---|---|---|---|
| CN | 1035038 A | | 8/1989 |
| EP | 1 038 879 A1 | | 9/2000 |
| JP | 41-1437 | * | 2/1966 |
| JP | 2-16101 | | 1/1990 |
| JP | 07-163385 | | 6/1995 |
| JP | 7-184608 | | 7/1995 |
| JP | 7-284652 | | 10/1995 |
| JP | 9-131166 | | 5/1997 |
| JP | 09-131166 A | | 5/1997 |
| WO | WO 99/24447 | * | 5/1999 |

OTHER PUBLICATIONS

Caplus abstract of JP 41-1437 (1966) Accession No. 1966:75164.*
Hahn-Hagerdal, B. et al "The utilization of solid acid superacids for hydrolysis . . . " Eur. J. Appl. Microbiol. Biotechnol. (1983) vol. 17, pp. 344-348.*
Takara Bio Inc., "New drink containing anti-oxidation oligosaccharide, Liquid Agar, to go on sale", Internet Citation [online]. Jul. 6, 1998. Retrieved from the Internet: <URL:http://www.takarabio.com/news_e/1998/07/06.htm>, retrieved on Jul. 20, 2005.
Takara Bio Inc., "New diet soft drink containing anti-oxidation oligosaccharide, Liquid Agar Togarashi, to go on sale", Internet Citation [online]. Feb. 2, 1999. Retrieved from the Internet: <URL:http://www.takarabio.com/news_e/1999/02/02.htm>, retrieved on Jul. 20, 2005.
Chen, Hai-Min et al., Product Monitoring and Quantitation of Oligosaccharides Composition in Agar Hydrolysates by Precolumn Labeling HPLC, Talanta, Elsevier, Amsterdam, NL, Oct. 20, 2004, pp. 773-777.
Lim, Dong-Jung et al., Online—International Food Information Service (IFIS), Immobolization of Agarase for the Agarooligosaccharide Production, Korean Journal of Applied Microbiology and Biotechnology, 1999, vol. 27, No. 3, pp. 208-214 (abstract only).

* cited by examiner

*Primary Examiner*—Leigh C. Maier
(74) *Attorney, Agent, or Firm*—Browdy and Neimark, PLLC

(57) ABSTRACT

A material containing agarobiose; a method for preparing the material; and a food, a drink or a seasoning using the material, which is tasty and has the effect of alleviating a stimulant taste and of enhancing the depth of sweetness.

2 Claims, No Drawings

AGAROBIOSE-CONTAINING COMPOSITION

REFERENCE TO RELATED APPLICATIONS

The present application is the national stage under 35 U.S.C. §371 of international application PCT/JP00/02921, filed May 8, 2000 which designated the United States, and which application was not published in the English language.

TECHNICAL FIELD

The present invention relates to a saccharide composition derived from algae which is useful as an active ingredient of a pharmaceutical composition, or a functional food or drink, a method for producing the composition, and a food, drink or seasoning containing the composition and having excellent effects of abirritating a stimulative taste and enhancing amplitude of a sweet taste. The present invention also relates to a drink having a novel taste and an additive which is useful for the production of a food or a drink having an improved taste.

BACKGROUND ART

Agarobiose and saccharides containing agarobiose are obtained by hydrolyzing agarose, agaropectin or the like, which are polysaccharides contained in seaweed or red algae. Conventionally, no attempt has been made to intentionally use agarobiose or saccharides containing agarobiose for foods, drinks or seasonings.

OBJECTS OF INVENTION

The main object of the present invention is to provide a material that contains agarobiose and a method for producing the material, and to provide a tasty food, drink and seasoning having effects of abirritating, i.e. reducing the irritability, a stimulative taste, and also enhancing amplitude of a sweet taste utilizing the material.

SUMMARY OF INVENTION

The present invention is outlined as follows. The first aspect of the present invention relates to agarobiose and/or an agarobiose-containing composition produced by a process comprising decomposing an agarobiose-containing material using a solid acid.

In an exemplary embodiment of the first aspect, there is provided agarobiose and/or an agarobiose-containing composition, wherein the solid acid is a substance that has a functional group that results in a cation, and is capable of hydrolyzing in a solid form in a reaction mixture.

The agarobiose-containing composition is not specifically limited as long as it contains agarobiose. For example, it contains 0.5 to 90% (w/w) of agarobiose and 10 to 99.5% (w/w) of agarooligosaccharide(s) other than agarobiose. Based only on the agarooligosaccharide content, it contains 5 to 60% (w/w) of agarobiose and 40 to 95% (w/w) of agarooligosaccharide(s) other than agarobiose in view of balance between agarobiose and oligosaccharide(s) in a composition.

The second aspect of the present invention relates to a method for producing agarobiose and/or an agarobiose-containing composition, the method comprising decomposing an agarobiose-containing material using a solid acid.

The third aspect of the present invention relates to a food, drink or seasoning which contains agarobiose and/or an agarobiose-containing composition.

In one embodiment of the third aspect, there is provided a food, drink or seasoning which contains agarobiose and/or an agarobiose-containing composition and in which the stimulative taste is abirritated and/or the amplitude of the sweet taste is enhanced.

In an exemplary embodiment of the third aspect, there is provided a food, drink or seasoning which contains agarobiose and/or an agarobiose-containing composition at a concentration of 0.01 to 90% (w/w).

In an exemplary embodiment of the third aspect, there is provided a drink containing a liquid agar.

The fourth aspect of the present invention relates to a drink containing a liquid agar and having improved fluidity, wherein the liquid agar is produced by a process comprising dissolving a raw material agar and changing the temperature of the resulting solution across the solidifying point temperature of the agar while forcibly stirring.

In an exemplary embodiment of the fourth aspect, there is provided a drink containing a liquid agar and having improved fluidity, which has thick texture and leaves little aftertaste.

In an exemplary embodiment of the fourth aspect, there is provided a drink containing a liquid agar, which has viscosity of 5 to 300 cps.

The fifth aspect of the present invention relates to a method for producing a drink containing a liquid agar and having improved fluidity, the method comprising dissolving a raw material agar and changing the temperature of the resulting solution across the solidifying point temperature of the agar while forcibly stirring to obtain a liquid agar.

The sixth aspect of the present invention relates to a formulation for abirritating a stimulative taste or enhancing amplitude of a sweet taste, which contains agarobiose and/or an agarobiose-containing composition.

The seventh aspect of the present invention relates to a method for abirritating a stimulative taste or enhancing amplitude of a sweet taste, the method comprising adding agarobiose and/or an agarobiose-containing composition.

DETAILED DESCRIPTION OF THE INVENTION

Hereinafter, the present invention will be explained in detail. As used herein, % means % (w/w) unless otherwise indicated.

The agarobiose-containing composition of the first aspect of the present invention is obtained by a process comprising decomposing an agarobiose-containing material using a solid acid, and contains at least agarobiose as a constituent. Although it is not intended to limit the present invention, constituents contained in the composition are exemplified by agarooligosaccharides each having a structure in which agarobiose units are repeated such as agarotetraose, agarohexaose and agarooctaose.

The agarobiose-containing material of the present invention is not specifically limited as long as it generates agarooligosaccharides such as agarobiose upon acid decomposition. Examples thereof include polysaccharides having agarobiose units in their molecules such as viscous polysaccharides from red algae such as agarose, agaropectin, funoran, porphyran, carrageenan, furcellaran and hypnean [Kyoritsu-shuppan Inc., "Tatouseikagaku 1—Kagakuhen— (Biochemistry of Polysaccharides 1—Chemistry—), pp. 314 (1969)].

The agarobiose-containing materials also include materials that contain these polysaccharides. For example, red algae belonging to Gelidiaceae such as *Gelidium amansii, Gelidium japonicum, Gelidium pacificum, Gelidium subcostatum, Pterocladia tenuis* and *Acanthopeltis japonica*, red algae belonging to Gracilariaceae such as *Gracilaria verrucosa* and *Gracilaria gigas*, red algae belonging to Ceramiaceae such as *Ceramium kondoi* and *Campylaephora hypnaeoides*, as well as other red algae are used as raw materials for agarose and agaropectin. Usually, several kinds of algae are used in combination as the raw materials. Usually, algae dried in the sun are used as the raw materials. Both of fresh algae and dried algae can be used in the present invention. Algae that are bleached while spraying water during the drying, so-called bleached raw algae, can also be used.

"Gelidium jelly" is obtained by extracting raw material algae with hot water and then cooling the extract. Agar is obtained by removing water from the gelidium jelly by freeze-dehydration or compression-dehydration and drying it. Agar in various forms including bar, belt, board, thread and powder can be used regardless of the source algae. Agar normally contains about 70% of agarose and about 30% of agaropectin. The agar can be further purified to prepare agarose with high purity. Purified agarose with low purity or high purity having various agarose contents can be used.

The agarobiose-containing materials include the above-mentioned raw material algae for agar, gelidium jelly, agar, purified agarose, purified agaropectin and intermediate products or by-products that are obtained during the production of these substances.

Carrageenan is a polysaccharide that is contained in red algae belonging to Gigartinaceae, Solieriaceae, Hypneaceae and the like. κ-Carrageenan, λ-carrageenan and η-carrageenan are known.

The solid acid used for acid decomposition of an agarobiose-containing material is a substance that has a functional group that results in a cation, and is capable of hydrolyzing in a solid form in a reaction mixture. Examples thereof include natural minerals (acid clay, clarite, bentonite, kaolin, fuller's earth, montmorillonite, Florisil and zeolite), solidified acids (silica gel sulfate, silica gel phosphate, silica gel malonate, alumina, phosphoric acid/quartz sand (solid phosphoric acid) and calcined diatomaceous earth), cation exchange resins, and mixtures thereof. Solidified acids and cation exchange resins are preferable in view of operation. Cation exchange resins are suitable in view of efficiency of action in a mixture containing water.

The solid acid used for acid decomposition of an agarobiose-containing material is not specifically limited. For example, it is preferable to use a solid acid (e.g., a cation exchange resin, a cation exchange fiber or a cation exchange membrane) which acts in a solid phase. Examples of the resins include strong cation exchange resins Amberlite IR-120B, IR-118, IR-122 and IR-124, as well as Diaion SK102, SK104, SK106, SK110, SK112, SK116 and SK1B.

The reaction conditions for decomposition using a solid acid are not specifically limited. For example, the reaction temperature is 10 to 120° C., preferably 50 to 100° C. in view of operation and 80 to 100° C. in view of efficiency. The reaction time is 30 minutes to 12 hours, preferably 1 to 6 hours. Although it is not intended to limit the present invention, the amount of a solid acid is, for example, 0.1 to 50%, preferably 0.1 to 30%. The concentration of an agarobiose-containing material as a substrate is 0.5 to 90%, preferably 1 to 85%. The reaction may be conducted by a batch method. Alternatively, it may be a continuous reaction. Specifically, the reaction can be conducted by passing a solution containing an agarobiose-containing material through a resin column.

The solid acid and the concentration thereof, and the temperature and time of the reaction may be suitable selected. Such selection depends on the following: the agarobiose-containing material used such as agarose or carrageenan; the yield of the agarobiose-containing composition of interest; and the degree of polymerization of agarobiose units in the agarooligosaccharide of interest. In general, the decomposition reaction using a strong cation exchange resin is more efficient than that using a weak cation exchange resin. Furthermore, the acid decomposition reaction proceeds more rapidly by using a more amount of a solid acid relative to the amount of the agarobiose-containing material, and selecting a higher reaction temperature.

A solution of the agarobiose-containing composition of the present invention is obtained by converting a Na-type commercially available strong cation exchange resin into a H-type one as a solid acid using 1N hydrochloric acid and placing 1 part by weight of the converted resin in 89 parts by weight of deionized water, suspending 10 parts by weight of agar in the resulting mixture, and heating the suspension at 95° C. for 180 minutes. Such a solution does not gelate any longer even if the solution is cooled to its solidifying point. When the saccharides contained in the solution are analyzed with gel filtration HPLC, normal phase HPLC and the like, saccharides with high molecular weight are scarcely observed and most of the saccharides are found to be decomposed to soluble agarooligosaccharides composed of 10 or less sugars.

The agarobiose-containing composition obtained as described above is not specifically limited as long as it contains agarobiose. An agarobiose-containing composition as a material for a food, drink or seasoning preferably contains 0.5 to 90% of agarobiose and 10 to 99.5% of agarooligosaccharide(s) other than agarobiose, preferably 1 to 70% of agarobiose and 30 to 99% of agarooligosaccharide(s) other than agarobiose, 5 to 60% of agarobiose and 40 to 95% of agarooligosaccharide(s) other than agarobiose in view of balance between agarobiose and oligosaccharide(s) in a composition.

Agarobiose can be purified from the agarobiose-containing composition using gel filtration, molecular weight fractionation or the like.

Advantages of the method for producing an agarobiose-containing composition of the present invention in which a solid acid is used over the conventional acid decomposition in which a liquid acid is used are as follows: (1) the solid acid is readily separated and removed from the reaction product, and the acid does not remain in the product; (2) the reaction vessel is not corroded; (3) the amount of a reaction by-product is little because the reaction does not proceed too much and, therefore, the quality and yield are improved; (4) the substrate concentration is readily increased because the acid concentration is not high; and (5) the cost may be reduced because the solid acid can be regenerated and reused. In other words, the solid acid used in the present invention provides above-mentioned advantages.

The agarobiose-containing composition of the present invention is exemplified by the agarobiose-containing composition as described in Example 1 which contains 44% of agarobiose and 43% of agarooligosaccharides including agarotetraose and agarohexaose (hereinafter referred to as Agabiose) or the agarobiose-containing composition as described in Example 2 which contains 16% of agarobiose and 70% of agarooligosaccharides (hereinafter referred to as Agaoligo). Such agarobiose-containing compositions can be used as active ingredients for foods, drinks or seasonings depending on the objects.

The agarobiose-containing composition is at a low concentration, has a reduced sweet taste, and is odorless. An aqueous solution of the composition is almost colorless and transparent. Thus, it can be applied to various foods, drinks or seasonings.

The food, drink or seasoning of the third aspect of the present invention contains agarobiose and/or an agarobiose-containing composition. It is a food, drink or seasoning which contains, which is produced by diluting, and/or which is produced by adding thereto agarobiose and/or an agarobiose-containing composition.

The amount of agarobiose and/or an agarobiose-containing composition contained in the food, drink or seasoning of the third aspect is not specifically limited. An exemplary food, drink or seasoning contains agarobiose and/or an agarobiose-containing composition at a concentration ranging from 0.01% (w/w) to 90% (w/w).

The agarobiose-containing composition of the first aspect may be used as an agarobiose-containing composition. A product obtained by decomposing an agarobiose-containing material using a liquid acid such as an organic acid or an inorganic acid, or by enzymatically digesting the material may be also used as an agarobiose-containing composition. Furthermore, agarobiose purified from such an acid decomposition product or an enzymatic digestion product using gel filtration, a molecular weight fractionating membrane, ion exchange resins or the like can be used.

The foods, drinks or seasonings of the present invention are not specifically limited as long as they contain agarobiose and/or an agarobiose-containing composition and examples thereof include the following: products of processed cereal (e.g., wheat flour product, starch product, premixed product, noodle, macaroni, bread, bean jam, buckwheat noodle, wheat-gluten bread, rice noodle, gelatin noodle and packed rice cake), products of processed fat and oil (e.g., plastic fat and oil, tempura oil, salad oil, mayonnaise and dressing), products of processed soybeans (e.g., tofu, miso and fermented soybean), products of processed meat (e.g., ham, bacon, pressed ham and sausage), processed marine products (e.g., frozen ground fish, boiled fish paste, tubular roll of boiled fish paste, cake of ground fish, deep-fried patty of fish paste, fish ball, sinew, fish meat ham or sausage, dried bonito, product of processed fish egg, canned marine product and fish boiled in sweetened soy sauce), dairy products (e.g., raw milk, cream, yogurt, butter, cheese, condensed milk, powdered milk and ice cream), products of processed vegetables and fruits (e.g., paste, jam, pickle, fruit juice, vegetable drink and mixed drink), confectioneries (e.g., chocolate, biscuit, sweet bun, cake, rice-cake sweet, rice sweet and candy), alcoholic drinks (e.g., sake, Chinese liquor, wine, whisky, shochu, vodka, brandy, gin, rum, beer, soft alcoholic drink, fruit liquor and liqueur), luxury drinks (e.g., green tea, tea, oolong tea, coffee, soft drink and lactic acid drink), seasonings (e.g., soy sauce, sauce, vinegar, sweet sake and dressing-type seasoning), canned, bottled or bagged foods (e.g., various cooked foods such as rice topped with cooked beef and vegetables, rice boiled together with meat and vegetables in a small pot, steamed rice with red beans, and curry), semi-dried or condensed foods (e.g., liver paste, other spreads, soup for buckwheat noodle or udon and condensed soup), dried foods (e.g., instant noodle, instant curry, instant coffee, powdered juice, powdered soup, instant miso soup, cooked food, cooked drink and cooked soup), frozen foods (e.g., sukiyaki, chawan-mushi, grilled eel, hamburger steak, shao-mai, dumpling stuffed with minced pork, various stick-shaped foods and fruit cocktail), solid or liquid foods (e.g., soup), processed agricultural or forest products (e.g., spice), processed livestock products, processed marine products and the like.

The process for producing the food, drink or seasoning of the present invention is not limited to a specific one. Any processes including cooking, processing and other generally employed processes for producing a food, drink or seasoning can be used as long as the resultant food, drink or seasoning contains agarobiose and/or an agarobiose-containing composition.

Aagarobiose and/or the agarobiose-containing composition may be added before, during or after the cooking or processing. Agarobiose and/or the agarobiose-containing composition may be diluted by adding thereto a cooked or processed product, or a material for the cooked or processed product. Agarobiose and/or the agarobiose-containing composition may be added during any one of steps of production of foods, drinks or seasonings. Agarobiose and/or the agarobiose-containing composition may be diluted by adding thereto a food, drink or seasoning, or a material therefor, to include it into the food, drink or seasoning. Agarobiose and/or the agarobiose-containing composition may be added once or several times. Then, a novel food, drink or seasoning can be conveniently produced. Such a food, drink or seasoning contains an effective amount of agarobiose and/or the agarobiose-containing composition and has an activity of abirritating the stimulative taste or enhancing the amplitude of the sweet taste. Regardless of the production steps selected, a food, drink or seasoning which contains, which is produced by adding thereto, and/or which is produced by diluting agarobiose and/or the agarobiose-containing composition, or such a food, drink or seasoning which contains an effective amount of agarobiose and/or the agarobiose-containing composition and has an activity of abirritating the stimulative taste or enhancing the amplitude of the sweet taste is defined as the food, drink or seasoning of the present invention.

The agarobiose-containing composition to be used for this purpose is exemplified by the Agabiose or the Agaoligo as described above, or a product obtained by decomposing an agarobiose-containing material using citric acid as described in Example 3 (hereinafter simply referred to as a citric acid decomposition product).

Examinational Example

The amount of an agarobiose-containing composition to be added was examined using model drinks.

Examinational Example 1

An acetic acid solution, a sodium chloride solution, a capsaicin solution and a sucrose solution were prepared by dissolving commercially available acetic acid (3(w/v)%), sodium chloride (3% (w/v)), capsaicin for a pungent taste (0.01% (w/v)) or sucrose (5% (w/v)) in 0.01 M lactate buffer (pH 3.8) in order to conduct model tests for drinks. Acetic acid solutions, sodium chloride solutions, capsaicin solutions and sucrose solutions each containing an agarobiose-containing composition were prepared by adding Agabiose or Agaoligo prepared from agar to the respective solutions. The Agabiose contained 2.3% water, 9.8% galactose, 44.1% agarobiose, and 43.4% saccharides from the decomposed agar including agarotetraose and agarohexaose (pH 5.2).

The Agaoligo contained 2.3% water, 9.5% galactose, 16.2% agarobiose, and 70.3% saccharides from the decomposed agar including agarotetraose and agarohexaose (pH 5.1). Sensory evaluation for an acid, salty, pungent or sweet taste was conducted using the thus obtained solutions. The panel consisted of 20 members. Four grades were used for the evaluation (the degrees of abirritating of the stimulative taste of the acetic acid solution, the sodium chloride solution or the capsaicin solution were expressed as follows: +++: remarkable abirritating, ++: sufficient abirritating, +: slight abirritating, and −: no abirritating; the degree of enhancement of amplitude of the sweet taste of the sucrose =solution was expressed as follows: +++: remarkable enhancement, ++: sufficient enhancement, +: slight enhancement, and −: no enhancement). The mean values of the results are shown in Table 1.

As used herein, a degree of abirritating of a stimulative taste refers to effectiveness in abirritating the direct stimulus of an acid, salty or pungent taste to a tongue, and sensation of a mild stimulus as a result of elimination of, to use common expression, "sukado" (sharpness of an acid taste) or "shiokado" (sharpness of a salty taste), or total harmonization of a bitter taste or a pungent taste. Furthermore, a degree of enhancement of amplitude of a sweet taste is described as follows. The degree or quality of the sweet taste of each of, for example, saccharides, sugar and glucose as an individual component is constant and the sweet taste is simple. However, if they are combined with agarobiose and/or an agarobiose-containing composition, a varying sweet taste is generated as a result of heterogenous degree or quality of the sweet taste, and sensory amplitude which is not generated using an individual saccharide is recognized.

sition added at a concentration more than 0.01%. The amplitude was remarkably enhanced using the composition at a concentration of 1% or more.

The activity of abirritating a stimulative taste or enhancing amplitude of a sweet taste tends to be increased to some extent when the content of agarobiose is increased. When a solution containing the acetic acid solution (3% (w/v)), the sodium chloride solution (3% (w/v)), the capsaicin solution (0.01% (w/v)) and the sucrose solution (5% (w/v)) each containing an agarobiose-containing composition were used, similar results as those for solutions each containing agarobiose alone were obtained.

The content of agarobiose and/or the agarobiose-containing composition of the present invention in a food, drink or seasoning is not specifically limited, and can be suitably selected based on the sensory taste. Agarooligosaccharides can be quantitatively measured, for example, by using high performance liquid chromatography equipped with two TOSOH TSK-GEL ALPHA-2500 columns connected in series, eluting with $H_2O$ as a solvent at a flow rate of 0.3 ml/minute at a temperature of 60° C., and detecting based on refractive index (RI). The amount to be added as the content of agarobiose in 100 parts of a food, drink or seasoning is 0.01 part or more, preferably 0.01 to 90 parts in view of the taste as a food, drink or seasoning, or abirritating of a stimulative taste or amplitude of a sweet taste, more preferably 0.01 to 50 parts in view of cost, as measured by this method. Alternatively, if agarobiose is measured by allowing β-galactosidase to act on agarobiose using F-kit Lactose/ Galactose (Boehringer-Mannheim), the amount to be added as the content of agarobiose is 0.02 part or more, preferably

TABLE 1

Sensory evaluation of model drinks

| Amount of agarobiose-containing composition added (%, w/v) | | | Degree of abirritating of stimulative taste | | | | | | Degree of enhancement of amplitude of | | |
|---|---|---|---|---|---|---|---|---|---|---|---|
| Agarobiose-containing composition (%) | Agarobiose (%) | | Acetic acid solution | | Sodium chloride solution | | Capsaicin solution | | sweet taste Sucrose solution | | |
| I, II | I | II | Acid taste | | Salty taste | | Pungent taste | | Sweet taste | Total evaluation | |
| 0 | 0 | 0 | − | − | − | − | − | − | − | − | − | − |
| 0.01 | 0.004 | 0.0016 | − | − | − | − | − | − | − | − | − | − |
| 0.1 | 0.044 | 0.016 | + | + | + | + | + | + | + | + | + | + |
| 0.5 | 0.22 | 0.081 | ++ | + | ++ | + | ++ | + | ++ | + | ++ | ++ |
| 1 | 0.44 | 0.162 | +++ | ++ | +++ | ++ | +++ | ++ | +++ | ++ | +++ | +++ |
| 5 | 2.21 | 0.81 | +++ | +++ | +++ | +++ | +++ | +++ | +++ | +++ | +++ | +++ |
| 10 | 4.41 | 1.62 | +++ | +++ | +++ | +++ | +++ | +++ | +++ | +++ | +++ | +++ |
| 30 | 13.23 | 4.86 | +++ | +++ | +++ | +++ | +++ | +++ | +++ | +++ | +++ | +++ |
| 50 | 22.1 | 8.10 | +++ | +++ | +++ | +++ | +++ | +++ | +++ | +++ | +++ | +++ |
| 70 | 30.90 | 11.34 | +++ | +++ | +++ | +++ | +++ | +++ | +++ | +++ | +++ | +++ |
| 90 | 39.70 | 14.58 | +++ | +++ | +++ | +++ | +++ | +++ | +++ | +++ | +++ | +++ |

In Table 1, I means the Agabiose and II means the Agaoligo.

As show in Table 1, the abirritating of stimulative taste of the acid taste, the salty taste or the pungent taste was observed in the sensory evaluation using the agarobiose-containing composition added at a concentration more than 0.01%. The stimulative taste was abirritated at a concentration of 0.1%, and sufficiently abirritated at a concentration more than 0.1%. The stimulative taste was remarkably abirritated using the composition at a concentration of 1% or more. Similarly, the enhancement of amplitude of sweet taste was observed using the agarobiose-containing compo- 0.02 to 40 parts, more preferably 0.02 to 22 parts. As used herein, parts mean parts by weight.

The food, drink or seasoning of the present invention may be in any form including a form that enables oral intake such as tablet, granule, capsule, gel or sol as long as it contains agarobiose and/or the agarobiose-containing composition of the present invention. The drink of the present invention is exemplified by a drink containing a liquid agar.

The food, drink or seasoning of the present invention contains agarobiose and/or an agarobiose-containing composition which has activities of abirritating a stimulative taste and enhancing amplitude of a sweet taste. Thus, it is a food, drink or seasoning in which the stimulative taste is abirritated and/or the amplitude of the sweet taste is enhanced.

According to the present invention, agarobiose and/or an agarobiose-containing composition may be mixed with a saccharide from another source and used as a material for a food, drink or seasoning. For example, it may be mixed with a decomposition product derived from a polysaccharide such as starch or the like.

The present invention provides a formulation for abirritating a stimulative taste or enhancing amplitude of a sweet taste which contains agarobiose and/or an agarobiose-containing composition as an active ingredient. The formulation can be formulated according to a known method for producing a food additive. The formulation is useful as a food additive for the production of a food, drink or seasoning having an improved taste.

Furthermore, the present invention provides a method for abirritating a stimulative taste or enhancing amplitude of a sweet taste, in which agarobiose and/or an agarobiose-containing composition is used as an active ingredient. The method is useful for the production of a food, drink or seasoning having an improved taste.

The food, drink or seasoning containing agarobiose and/or an agarobiose-containing composition provided by the present invention has excellent effects of preventing arthritis and rheumatism based on the activities of preventing arthritis and rheumatism of agarobiose and/or agarooligosaccharides contained therein.

Since agarobiose and agarooligosaccharides have activities of inhibiting nitrogen monoxide production, they prevent diseases caused by overproduction of nitrogen monoxide in a body due to stimuli such as stress and ultraviolet rays which results in destruction of surrounding cells. Such diseases include chronic renal insufficiency, ulcerative colitis, arthritis, rheumatism, Alzheimer's disease, cataract, glaucoma, cancer and diseases due to vascularization. Thus, the food, drink or seasoning containing agarobiose and/or an agarobiose-containing composition provided by the present invention has effects of preventing or treating diseases such as chronic renal insufficiency, ulcerative colitis, arthritis, rheumatism, Alzheimer's disease, cataract, glaucoma, cancer and diseases due to vascularization.

Agarobiose and agarooligosaccharides exhibit excellent anti-inflammatory activities by specifically inhibiting the production of PGE2 which causes pain and fever. Thus, the food, drink and seasoning of the present invention has an excellent antarthritic effect.

Furthermore, agarobiose and agarooligosaccharides inhibit rapid absorption of glucose through digestive tracts by inhibiting an enzyme that converts saccharides in food into glucose. Thus, the food, drink or seasoning of the present invention has a weight reducing effect and an effect on arthritis due to obesity.

Excessive nitrogen monoxide which threatens one's health is normalized by daily intake of the food, drink or seasoning of the present invention. Thus, the food, drink or seasoning of the present invention is very useful for the maintenance of homeostasis in a living body.

The present invention provides a drink containing a liquid agar which has a novel taste and novel texture, as well as a method for producing the drink.

Agar is a natural material which has been familiar to Japanese people since old times. Sol-type foods prepared using agar are widely eaten, including sweets (e.g., sweet bean jelly (yokan); and soft sweet bean jelly (mizuyokan)) and foods (e.g., gelidium jelly (tokoroten); boiled beans, agar—agar cubes and other delicacies with treacle poured on (mitsumame); and apricot-kernel tofu (annintofu)).

Healthiness is strongly required for foods in recent years. Then, attention has been drawn to a drink containing agar, a natural material consisting of polysaccharide dietary fibers, i.e., a drink containing a sol-type liquid agar having fluidity. A food prepared by using a low-strength agar and a drink containing agar having fluidity as a drink containing dietary fibers are disclosed in JP-A 6-38691. Recently, a drink containing a solated agar is out on the market. Since its thick texture is preferred, the drink is widely drunk as a drinkable agar. As an example of solid gel-type foods being made drinkable, a drinkable yogurt has become familiar. New types of foods are actively developed by converting conventional gel-type foods into sol-type ones. Among these, a drinkable agar is one of sol-type drinks favorably accepted by the market since it contains natural polysaccharides and, therefore, makes good impression concerning healthiness.

In general, a raw material agar is dissolved by heating in a solution when a gel product is prepared from the agar. The dissolution temperature of the raw material agar is higher than the gelatinization temperature of starch. The raw material agar is dissolved in water at 75° C. or above, usually by heating at about 80 to 93° C. On the other hand, the temperature of the heat-dissolved agar is lowered to 45° C. or below for solidification. The solidifying point temperature of agar is normally 35 to 45° C. It is well known that when the temperature of dissolved product is lowered across the solidifying point temperature, the heated fluid in a sol state is gelated and solidified.

Accordingly, a gel product of agar is prepared by pouring a agar heat-dissolved in a solution in a sol state into a mold, and allowing the temperature to drop and pass across the solidifying point temperature to a temperature below the solidifying point for solidification. On the other hand, if the agar is used to prepare a drinkable product containing a liquid agar having the fluidity of the agar, it is important to retain the good properties of agar in conventional gel products. Furthermore, texture as a sensory flow property is important, in particular, in view of applicability to a drink. As used herein, a sensory flow property refers to thick texture, little aftertaste, and a good feeling upon passage through one's throat. In addition, it is also important as a product that the sensory flow property remains unchanged over time and is stable. The fluidity includes a physical flow property in addition to the above-mentioned sensory flow property. The physical flow property can be evaluated, for example, by measuring it using a viscometer. As used herein, "having improved fluidity" means that a sensory and/or physical flow property is significantly improved. Improvement includes a less reduction in a physical property over time.

A drink containing a liquid agar has a property due to the polysaccharides in the agar as its texture. Although the thick texture unique of agar is required for the drink, such texture may leave aftertaste for a long time on the contrary. Thus, it is also required that thick texture exerted upon intake rapidly disappears, i.e., that little aftertaste is left. These two sensory flow properties may conflict each other. Therefore, the way to have both properties becomes a problem to be solved. A good feeling upon passage through one's throat is also required. An improved drink containing a liquid agar is a product that meets with all of the three requirements. It is industrially important to provide a product that retains the properties over time.

The present invention provides a novel and less viscous drink containing a liquid agar and having improved fluidity. The drink has thick texture, leaves little aftertaste, and confers a good feeling upon passage through one's throat. Such texture is retained over time. The present invention also provides a method for producing such a drink.

Specifically, the present invention provides a drink containing a liquid agar and having improved fluidity, wherein the liquid agar is obtained by a production process comprising dissolving a raw material agar and changing the temperature of the resulting solution across the solidifying point temperature of the agar while forcibly stirring.

Furthermore, the present invention provides a method for producing a drink containing a liquid agar and having improved fluidity, the method comprising dissolving a raw material agar and changing the temperature of the resulting solution across the solidifying point temperature of the agar while forcibly stirring to obtain a liquid agar.

Although it is not intended to limit the present invention, the present invention provides a drink containing a liquid agar that has thick texture and leaves little aftertaste.

Furthermore, although it is not intended to limit the present invention, the solidifying point temperature in the present invention is preferably 35 to 45° C., and the concentration of the raw material agar in the drink containing a liquid agar is preferably 0.01 to 1.0% (w/v).

The present invention provides a drink containing a liquid agar and having improved fluidity, which provides novel texture.

The present inventors have found that a drink containing a liquid agar and having improved fluidity and a method for producing the drink can be provided. Such a drink is obtained by a process comprising dissolving agar and lowering the temperature of the resulting solution across the solidifying point temperature of the agar while forcibly stirring. The drink has the following properties: its texture is remarkably improved; it has thick texture which is suitable as a drink; it leaves little aftertaste; it confers a good feeling upon passage through one's throat; texture resulting from these sensory flow properties is retained over time; and the decrease in viscosity is remarkably reduced. Thus, the present invention has been completed.

As used herein, a liquid agar means an agar that has fluidity at a temperature below its solidifying point.

The raw material agar used in the present invention is not specifically limited as long as the agar is edible. The agar is exemplified by a commercially available agar in a form of powder, thread or bar. The jelly strength of the agar is 10 to 900 g/cm$^2$. Although it is not intended to limit the present invention, use of agar having a low jelly strength is advantageous if the content of liquid agar in a drink containing a liquid agar is to be increased for the following reasons. It is conveniently handled upon the preparation of a drink; the fluidity can be retained even if the amount of agar used is increased; and, consequently, the drink can contain much agar. The jelly strength is defined as the maximal weight (in gram) per cm$^2$ of the surface of a gel withstood by the gel for 20 seconds. The gel is prepared by dissolving agar at a concentration of 1.5% and allowing the resulting solution to stand at 20° C. for 15 hours for solidification (Y. Ito, Kanten no tokusei to riyo (Property and utilization of agar), Shoku No Kagaku (Food Chemistry), 211(9):18–27 (1995)).

The concentration of a raw material agar used in an end product is 0.005 to 1.5% (w/v), preferably 0.01 to 1.0% (w/v) in view of fluidity. Regarding the amount of agar to be used for a drink, an amount of agar having a high jelly strength less than agar having a low jelly strength is used to achieve a predetermined viscosity because the viscosity is increased as the jelly strength is increased.

The agar can be dissolved at a concentration higher than the final concentration because the concentration is to be adjusted to the predetermined final concentration during the production process. The agar concentration upon dissolution is equal to or higher than the final concentration, preferably up to 5-fold higher in view of operation. The agar may be used alone or it may be used in combination with other edible viscous materials. Examples of viscous materials that can be used in combination include alginic acid, carrageenan, fucoidan and propylene glycol ester derived from seaweed; guar gum, tara gum, locust bean gum, tamarind and psyllium seed gum derived from seeds; glucomannan derived from rhizomes; gum arabic, tragacanth gum and karaya gum derived from plant sap; pectin derived from fruits; xanthane gum, gellan gum, curdlan and pullulan produced by microorganisms; gelatin, whey protein, casein and collagen which are proteins; carboxymethylcellulose, methycellulose and crystallite cellulose which are cellulose derivatives; as well as starch and dextrin, or decomposition products therefrom. The decomposition method is not specifically limited as long as the decomposition product has viscosity. The method is exemplified by acid decomposition or enzymatic digestion. The degree of decomposition may be optionally determined. The amount of a viscous polysaccharide (excluding agar) used in combination is 0.005 to 1% (w/v), preferably 0.01 to 0.5% (w/v) in view of one's taste. Whether the agar is used alone or in combination with a viscous material, the viscosity of the end product is 5 to 300 cps, preferably 5 to 200 cps in view of one's taste, as measured using a B-type viscometer (BM type, Tokimec) at 30 rpm at 20° C.

The conditions used for dissolving a raw material agar in the present invention are not specifically limited. The solvent used may consist of water alone or it may contain substances that may be contained in a drink such as saccharides, organic acids, minerals and vitamins. The raw material agar is added to such a solvent and dissolved. The temperature for dissolution is 75 to 100° C., preferably 80 to 95° C. (the dissolution temperature). The time for dissolution is, without limitation, 1 minute or longer at the dissolution temperature of the raw material agar, preferably 3 to 60 minutes, The raw material agar may be added when the temperature is elevated to 80 to 95° C. The agar may be added at normal temperature and then heated. Alternatively, the agar may be added during heating. Stirring can be optionally conducted during the dissolution. A raw material agar may or may not be swollen by soaking it in water prior to dissolution for pretreatment. The pH upon dissolution is 3 to 7, preferably 4 to 6. The dissolution may be conducted by chemical means instead of heating. Dissolution may be conducted under alkaline conditions (above pH 7).

Changing the temperature of the solution across the solidifying point temperature of the dissolved agar while forcibly stirring according to the present invention is explained below. The solidifying point temperature of the agar refers to the temperature at which the state of 1.5% (w/v) agar solution is changed from sol to gel when the temperature is lowered. The solidifying point temperature is 30 to 50° C., preferably 35 to 45° C., more preferably 37 to 42° C. although it varies depending on the type, gel strength and/or concentration of agar. The time for changing the temperature is, without limitation, a few seconds or longer, preferably 30 seconds to 60 minutes. The means for the forcible stirring of the agar solution is not specifically limited, and is exemplified by stirring or flowing using a stirrer, stirring or flowing using a pump, manual or mechanical shaking, manual or mechanical vibration, sonication (ultrasonic vibration), or a combination thereof. The step of changing the temperature while forcibly stirring may be conducted at any stage in the production process. It may be conducted before or after the drink is filled into a package. If the step is conducted after the drink is filled, the package may be shaken manually or using a shaker. If the step is conducted on a bottling line, the package may be vibrated by the vibration generated during transportation on a conveyer. The temperature may be lowered by any means, for example, cooling using cold water or a refrigerator, or allowing to stand and cool at normal temperature.

The liquid agar obtained by a process comprising changing the temperature of the agar solution across the solidifying point temperature of the agar while forcibly stirring is a liquid agar having improved fluidity, which is useful as a raw material for various foods or drinks. Thus, the present invention provides a novel liquid agar.

For example, the drink containing a liquid agar and having improved fluidity of the present invention is produced by dissolving a raw material agar in a warm water at 70° C. or above, adding a solution of predetermined components (a sweetener, an acidulant, a flavor and the like) thereto, heating the mixture at 80° C. or above for 30 seconds to 30 minutes, then at 95° C. for 1 minute, filling into a container such as a can and then packing it. Containers that can be used include, but are not limited to, cans, pouches (three sided bags, standing bags, gusseted bags), pouches with spouts, paper packs and bottles. Nitrogen gas may be used for filling. If the fluid in the container is acidic (pH 2 to 4), sterilization is conducted by heating at 80 to 90° C. for 2 to 7 minutes. If the pH is 4 to 7, sterilization is conducted by heating at 115° C. for 15 to 20 minutes. The sterilized product is then subjected to the step of changing the temperature across the solidifying point temperature of the agar while forcibly stirring. Thus, a drink containing a liquid agar can be obtained.

Ethyl alcohol at a final concentration of 1 to 10% (v/v) may be optionally added to the drink containing a liquid agar and having improved fluidity of the present invention to prepare an alcoholic drink containing a liquid agar and having improved fluidity. Alternatively, carbon dioxide may be introduced to prepare a carbonated drink containing a liquid agar and having improved fluidity. Furthermore, a carbonated alcoholic drink containing a liquid agar and having improved fluidity that contain both ethyl alcohol and carbon dioxide may be prepared.

A novel drink containing a liquid agar and having improved fluidity and a method for producing the drink can be provided by combining the procedures as described above. Then, a drink containing a liquid agar that has thick texture, leaves little aftertaste and confers a good feeling upon passage through one's throat can be provided. These properties are retained over time and the viscosity is scarcely reduced. Thus, the drink would be accepted by the market.

In addition, a frozen product obtained by freezing the drink containing a liquid agar of the present invention is a sherbet-like food having a novel taste.

EXAMPLES

The following Examples illustrate the present invention in more detail, but are not to be construed to limit the scope thereof.

Example 1

For making an agarobiose-containing composition, a commercially available agar (Ina agar type S-7, Ina Shokuhin Kogyo) was dissolved in deionized water at a concentration of 10% (w/v). A strong cation exchange resin active type (H+) (Diaion SK-104, Mitsubishi Chemical) was further added thereto at a concentration of 1% (w/v). Hydrolysis was carried out at 90° C. for 3 hours. After reaction, the mixture was cooled to normal temperature and subjected to solid-liquid separation (removal of the resin from the solution). The resulting solution was treated with active carbon at a concentration of 2% (w/v) to remove colored substances and the like and filtrated through a filter with pore size of 1 μm. After adjusting the pH using 1N NaOH, the filtrate was lyophilized according to a conventional method to prepare Agabiose as an agarobiose-containing composition.

The Agabiose contained 2.3% water, 9.8% galactose, 44.1% agarobiose, and 43.4% agarooligosaccharides including agarotetraose and agarohexaose (pH 5.2).

Example 2

Ina agar type S-7 was dissolved in deionized water at a concentration of 10% (w/v). A strong cation exchange resin active type (H+) as described in Example 1 was further added thereto at a concentration of 1% (w/v). Hydrolysis was carried out at 90° C. for about 1.5 hours. After reaction, the mixture was cooled to normal temperature and subjected to solid-liquid separation. The resulting solution was treated as described in Example 1 to prepare Agaoligo as an agarobiose-containing composition.

The Agaoligo contained 2.3% water, 9.5% galactose, 16.2% agarobiose, and 70.3% agarooligosaccharides including agarotetraose and agarohexaose (pH 5.1).

Example 3

In an agar type S-7 was dissolved in deionized water at a concentration of 10% (w/v). Citric acid was added thereto at a concentration of 1% (w/v). Hydrolysis was carried out at 95° C. for 3 hours. After reaction, the mixture was cooled to normal temperature. The resulting solution was treated with active carbon at a concentration of 2% (w/v) to remove colored substances and filtered to prepare a citric acid decomposition product as an agarobiose-containing composition.

The citric acid decomposition product contained 10% solid, 1% (w/v) citric acid, 3.1 g/L galactose, 14.8 g/L agarobiose, and 80 g/L agarooligosaccharides including agarotetraose and agarohexaose (pH 2.6).

Example 4

Green tea was prepared by using 10 g of green tea leaf, 0.2 g of vitamin C and 1000 ml of deionized water according to a conventional method. 0.5 g of the Agabiose or the Agaoligo was added to 100 ml of the green tea to prepare Products 1 and 2. Green tea without the addition of an agarobiose-containing composition was used as a control. Sensory evaluation for feeling on the tongue, taste, flavor and total evaluation was conducted. The panel consisted of 20 members. Five grades were used for the evaluation (5: good; 1: bad). The mean values of the results are shown in Table 2.

TABLE 2

Sensory evaluation

|  | Product 1 | Product 2 | Control |
|---|---|---|---|
| Feeling on tongue |  |  |  |
| Mellowness | 4.1 | 4.3 | 2.5 |
| Smoothness | 4.2 | 4.3 | 2.6 |
| Taste |  |  |  |
| Bitterness | 3.7 | 3.5 | 3.0 |
| Balance | 4.0 | 3.8 | 2.9 |
| Amplitude | 3.5 | 4.0 | 3.0 |
| Flavor | 3.5 | 3.5 | 3.2 |
| Total | 3.8 | 3.9 | 2.9 |

As shown in Table 2, each of the Products 1 and 2 had a mellower and smoother feeling on the tongue than the control. In addition, each product of the present invention was evaluated as having an appropriately abirritated bitter taste, improved balance and amplitude of the taste, and fine flavor of tea.

Example 5

A nutrient drink having the composition as shown in Table 3 was prepared according to a conventional method.

TABLE 3

Composition

| Fructose/glucose liquid sugar | 150 g |
|---|---|
| Purified honey | 2 g |
| Guarana extract | 1 g |
| Ginseng extract | 0.1 g |
| Royal jelly | 0.05 g |
| Vitamin C | 0.5 g |
| Nicotinic acid amide | 0.1 g |
| Vitamin B1 hydrochloride | 0.02 g |
| Vitamin B6 hydrochloride | 0.02 g |
| L-phenylalanine | 0.04 g |
| L-isoleucine | 0.01 g |
| Citric acid | 1.5 g |
| Flavor | 2 g |
| Deionized water | Remainder |
| Total | 1000 ml |

0.2 g of the Agabiose or the Agaoligo was added to 100 ml of the nutrient drink to prepare Products 3 and 4. A nutrient drink without the addition of an agarobiose-containing composition was used as a control. Sensory evaluation was conducted as described in Example 4. The results are shown in Table 4.

TABLE 4

Sensory evaluation

|  | Product 3 | Product 4 | Control |
|---|---|---|---|
| Feeling on tongue Mellowness Taste | 4.0 | 4.5 | 2.5 |
| Balance | 3.8 | 3.7 | 2.9 |
| Amplitude | 4.5 | 4.3 | 2.7 |
| Flavor | 3.5 | 3.5 | 3.2 |
| Total | 4.0 | 4.0 | 2.8 |

As shown in Table 4, each of the Products 3 and 4 had a mellower feeling on the tongue, had more excellent balance and amplitude of the taste, and left less aftertaste as compared with the control. Thus, the products of the present invention were very refreshing drinks.

Example 6

An alcoholic drink having the composition as shown in Table 5 was prepared according to a conventional method.

TABLE 5

Composition

| Frozen concentrated tangerine (Citrus unshiu) juice (Brix 45) | 110 g |
|---|---|
| Granulated sugar | 80 g |
| Citric acid | 2 g |
| Sodium citrate | 0.5 g |
| Orange essence | 2 g |
| 5% (v/v) aqueous alcohol solution | Remainder |
| Total | 1000 ml |

Note: the mixture was cooled to 5° C. and then carbonated using a soda siphon.

0.2 g of the Agabiose or the Agaoligo was added to 100 ml of the alcoholic drink to prepare Products 5 and 6. An alcoholic drink without the addition of an agarobiose-containing composition was used as a control. Sensory evaluation was conducted as described in Example 4. The results are shown in Table 6.

TABLE 6

Sensory evaluation

|  | Product 5 | Product 6 | Control |
|---|---|---|---|
| Feeling on tongue |  |  |  |
| Mellowness | 4.1 | 4.3 | 2.9 |
| Smoothness | 4.2 | 4.4 | 2.8 |
| Taste |  |  |  |
| Balance | 4.3 | 4.2 | 2.4 |
| Amplitude | 4.5 | 4.1 | 2.8 |
| Aftertaste | 4.3 | 4.5 | 3.2 |
| Total | 4.3 | 4.3 | 2.8 |

As shown in Table 6, the Products 5 and 6 had improved balance and amplitude of taste, and improved aftertaste as compared with the control. In particular, the acid taste of each product of the present invention was made mild as a result of the activity of abirritating a stimulative taste, resulting in a flavor and a taste like a fully ripened orange.

Example 7

A sports drink having the composition as shown in Table 7 was prepared according to a conventional method.

TABLE 7

Composition

| Glucose | 48 g |
|---|---|
| Fructose | 7.8 g |

TABLE 7-continued

| Composition | |
|---|---|
| Citric acid | 1.4 g |
| Sodium citrate | 1.0 g |
| Purified salt | 0.3 g |
| Calcium lactate | 0.1 g |
| Magnesium chloride | 0.1 g |
| Vitamin C | 0.2 g |
| Vitamin B1 hydrochloride | 0.02 g |
| Lemon lime flavor | 2 g |
| Deionized water | Remainder |
| Total | 1000 g |

0.3 g of the Agabiose or the Agaoligo was added to 100 g of the sports drink to prepare Products 7 and 8. A sports drink without the addition of an agarobiose-containing composition was used as a control. Sensory evaluation was conducted as described in Example 4. The results are shown in Table 8.

TABLE 8

| | Sensory evaluation | | |
|---|---|---|---|
| | Product 7 | Product 8 | Control |
| Feeling on tongue | | | |
| Mellowness | 4.1 | 4.4 | 2.6 |
| Smoothness | 4.0 | 4.2 | 2.4 |
| Taste | | | |
| Balance | 4.0 | 3.9 | 3.1 |
| Amplitude | 4.5 | 4.2 | 3.0 |
| Acid taste | 4.2 | 4.1 | 2.9 |
| Flavor | 3.7 | 3.8 | 3.0 |
| Total | 4.1 | 4.1 | 2.8 |

As shown in Table 8, each of the Products 7 and 8 had a more excellent feeling on the tongue, and more excellent balance and amplitude of taste than the control. The acid taste was abirritated and made mild. The respective components were excellently harmonized each other, resulting in remarkable maturing effects.

Example 8

A plum liqueur containing plum fruits was prepared as follows. 1440 g of 75% (w/w) fructose/glucose liquid sugar, 670 ml of 95% (v/v) alcohol for raw material and 340 ml of ladled water were mixed together in a 5-1 bottle with cap. 1 kg of unripe plums were then added thereto.

0.1 g of the Agabiose or the Agaoligo was added to 100 ml of the mixture upon preparation to prepare Products 9 and 10. A mixture without the addition of an agarobiose-containing composition was used as a control.

The respective bottles were capped and allowed to stand at room temperature. The unripe plums were soaked for 2 months while slightly stirring at intervals. 1020 ml of 28% (v/v) aqueous alcohol solution was then added and mixed. The maturation was further continues for 2 months to obtain a plum liqueur.

Sensory evaluation was conducted for the maturated plum liqueur as described in Example 4. The results are shown in Table 9.

TABLE 9

| | Sensory evaluation | | |
|---|---|---|---|
| | Product 9 | Product 10 | Control |
| Feeling on tongue | | | |
| Mellowness | 3.9 | 4.2 | 2.7 |
| Smoothness | 3.8 | 4.1 | 2.9 |
| Taste | | | |
| Balance | 4.6 | 4.5 | 2.5 |
| Amplitude | 4.4 | 4.2 | 2.6 |
| Aftertaste | 4.0 | 4.1 | 2.8 |
| Flavor | 3.6 | 3.7 | 3.2 |
| Total | 4.1 | 4.1 | 2.8 |

As shown in Table 9, each of the Products 9 and 10 had a more excellent feeling on the tongue, an abirritated acid taste like a product obtained by maturating for a long time as well as improved maturity, balance and amplitude of the taste, and left less aftertaste as compared with the control.

Example 9

0.5 g of the Agabiose or the Agaoligo was added to 100 ml of a normal homogenous milk (88.6% (w/v) water, 2.8% (w/v) protein, 3.5% (w/v) fat, 4.5% (w/v) lactose, 0.8% (w/v) ash). A milk without the addition of an agarobiose-containing composition was used as a control. Sensory evaluation was conducted as described in Example 4. The results are shown in Table 10.

TABLE 10

| | Sensory evaluation | | |
|---|---|---|---|
| | Product 11 | Product 12 | Control |
| Feeling on tongue | | | |
| Mellowness | 3.7 | 3.9 | 2.3 |
| Smoothness | 3.5 | 3.7 | 2.7 |
| Taste | | | |
| Balance | 4.3 | 4.4 | 3.1 |
| Amplitude | 4.4 | 4.6 | 2.4 |
| Aftertaste | 4.6 | 4.8 | 2.3 |
| Flavor | 4.0 | 4.1 | 3.5 |
| Total | 3.8 | 3.1 | 2.4 |

As shown in Table 10, each of the Products 11 and 12 had an improved feeling on the tongue, and improved balance and amplitude of the taste as compared with the control. The long-lasting aftertaste, i.e., the bad aftertaste, of milk was improved, making it easy to drink the milk.

Example 10

A soybean milk prepared from soybeans according to a conventional method was coagulated using a coagulant to prepare a normal "momengoshi tofu" (tofu prepared using cotton).

0.1 g of the Agabiose or the Agaoligo was added to 100 g of the soybean milk to prepare Products 13 and 14. A soybean milk without the addition of an agarobiose-containing composition was used as a control. Sensory evaluation was conducted as described in Example 4. The results are shown in Table 11.

TABLE 11

| | Sensory evaluation | | |
|---|---|---|---|
| | Product 13 | Product 14 | Control |
| Feeling on tongue | | | |
| Mellowness | 4.3 | 4.6 | 3.0 |
| Smoothness | 4.0 | 4.4 | 2.7 |
| Texture | 4.2 | 4.4 | 3.1 |
| Total | 4.2 | 4.5 | 2.9 |

As shown in Table 11, the Products 13 and 14 had an improved feeling on the tongue as compared with the control. The products of the present invention conferred "kinugoshi tofu" (tofu prepared using silk)-like feelings to the tongue although they actually were "momengoshi tofu" and the total evaluation was remarkably improved.

Example 11

As sweets, chocolate cream, candy and orange jelly were experimentally produced.

Chocolate cream was prepared by mixing two egg yolks, 125 ml of milk, 10 g of wheat flour and 30 g of sugar, and warming and kneading the mixture.

Candy was prepared by dissolving/mixing 1.2 kg of sugar and 0.8 kg of starch syrup using a dissolver at 110° C., boiling the solution using a cooker at 120 to 130° C. to make the water content become 2% or less, and adding 16.3 g of a 50% (by weight) lactic acid solution, 10.1 g of malic acid, 5.0 g of calcium carbonate and an appropriate amount of flavor.

Orange jelly was prepared by mixing 9 g of carrageenan and 180 g of granulated sugar, adding 800 ml of water thereto, mixing and heat-dissolving the mixture, and adding thereto 10 g of concentrated tangerine (*Citrus unshiu*) juice, 2 g of citric acid, 1.5 g of sodium citrate, 2 g of orange aroma and 1 g of flavor.

1 g of the Agabiose was added to 100 g of the chocolate cream (Product 15), the candy (Product 16) and the orange jelly (Product 17). 1 g of the Agaoligo was added to 100 g of the chocolate cream (Product 18), the candy (Product 19) and the orange jelly (Product 20). Products without the addition of an agarobiose-containing composition were used as controls. Sensory evaluation was conducted as described in Example 4. The results are shown in Table 12.

TABLE 12

| | Sensory evaluation | | | | | | | | | | | |
|---|---|---|---|---|---|---|---|---|---|---|---|---|
| | Feeling on tongue | | | Balance Amplitude | | | Texture | | | Total | | |
| | P | | | P | | | P | | | P | | |
| Chocolate cream | 15 | 18 | C | 15 | 18 | C | 15 | 18 | C | 15 | 18 | C |
| | 3.8 | 4.2 | 2.5 | 4.4 | 4.6 | 2.9 | 3.9 | 4.0 | 2.7 | 4.0 | 4.3 | 2.7 |
| | P | | | P | | | P | | | P | | |
| Candy | 16 | 19 | C | 16 | 19 | C | 16 | 19 | C | 16 | 19 | C |
| | 4.3 | 4.1 | 2.5 | 4.3 | 4.5 | 2.8 | 4.1 | 4.5 | 2.5 | 3.7 | 3.1 | 2.6 |
| | P | | | P | | | P | | | P | | |
| Orange jelly | 17 | 20 | C | 17 | 20 | C | 17 | 20 | C | 17 | 20 | C |
| | 4.1 | 4.5 | 2.3 | 4.0 | 4.1 | 3.0 | 4.2 | 4.4 | 2.5 | 4.1 | 4.3 | 2.6 |

P: the product of the present invention;
C: the control.

As shown in Table 12, each of the Products 15 and 18 (chocolate cream), 16 and 19 (candy), and 17 and 20 (orange jelly) had an improved smooth feeling on the tongue, improved balance and amplitude of the taste, as well as an abirritated acid taste as compared with the corresponding control. The tastes were totally made mild, and the products of the present invention were totally evaluated as being excellent.

Example 12

As meat paste products, boiled fish pastes and sausages were experimentally produced using fish meat and animal meat, respectively.

A boiled fish paste was prepared by adding 100 g of water and 20 g of salt to 1 kg of ground fish of Alaska pollack (SA class), finely grinding the mixture for 15 minutes, placing 40 g of the ground mixture in a vinyl pack, storing the pack at 5° C. overnight and then steaming at normal pressure for 15 minutes to obtain steamed boiled fish paste.

A sausage was prepared by mincing 2 kg of pork and 700 g of lard to a size of 5 mm, mixing therewith 7 g of pepper, 3 g of sage and 1 g of mace, cutting the mixture, casing the cut mixture into a pig intestine having a diameter of 2 cm, and steam-boiling for 15 minutes.

0.4 g of the Agabiose was added to 100 g of the boiled fish paste (Product 21) before finely grinding and the sausage (Product 22) before cutting. 0.4 g of the Agaoligo was added to 100 g of the boiled fish paste (Product 23) and the sausage (Product 24). Products without the addition of an agarobiose-containing composition were used as controls. Sensory evaluation was conducted as described in Example 4. The results are shown in Table 13.

TABLE 13

| | Sensory evaluation | | | | | | | | | | | |
|---|---|---|---|---|---|---|---|---|---|---|---|---|
| | Feeling on tongue | | | Balance Amplitude | | | Texture | | | Total | | |
| | P | | | P | | | P | | | P | | |
| Boiled fish paste | 21 | 23 | C | 21 | 23 | C | 21 | 23 | C | 21 | 23 | C |
| | 4.2 | 4.4 | 2.9 | 4.0 | 4.1 | 2.8 | 4.0 | 4.2 | 2.8 | 4.1 | 4.2 | 2.6 |
| | P | | | P | | | P | | | P | | |
| Sausage | 22 | 24 | C | 22 | 24 | C | 22 | 24 | C | 22 | 24 | C |
| | 3.7 | 3.8 | 2.7 | 4.0 | 3.8 | 2.9 | 3.7 | 3.8 | 2.6 | 3.8 | 3.8 | 2.7 |

P: the product of the present invention;
C: the control.

As shown in Table 13, each of the Products 21 and 23 (boiled fish paste) and 22 and 24 (sausage) had a mild feeling on the tongue, improved balance and amplitude of the taste, and increased elastic texture as compared with the corresponding control.

Example 13

As noodles, Chinese noodles were experimentally produced. Briefly, 25.4 g of a 50% (w/w) sodium lactate solution, 9.4 g of sodium malate, 10 g of calcium carbonate and 1.6 l of water were added to 4 kg of powder for Chinese noodles (wheat flour containing "kansui" (carbonated water used for making Chinese noodles) and the like). The mixture was mixed to prepare a powdered fish-like product. The product was used to make noodles using a household noodle-making machine (Sanyo Electric Co., Ltd.).

0.5 g of the Agabiose or the Agaoligo was added to 100 g of the noodles to prepare Products 25 and 26. Noodles without the addition of an agarobiose-containing composition were used as a control.

The thus-obtained Chinese noodles were cooked according to a conventional method. Sensory evaluation was conducted as described in Example 4. The results are shown in Table 14.

TABLE 14

Sensory evaluation

|  | Product 25 | Product 26 | Control |
|---|---|---|---|
| Feeling on tongue | 3.4 | 3.5 | 2.8 |
| Texture | 3.5 | 3.7 | 3.0 |
| Total | 3.5 | 3.6 | 2.9 |

As shown in Table 14, each of the Products 25 and 26 had a smoother feeling on the tongue, more elastic and crispy texture, and excellently lustrous appearance as compared with the control. Thus, the products of the present total evaluation was high.

Example 14

As bread, a loaf of bread and "paozu" (Chinese steamed bun) were experimentally produced according to conventional methods.

The compositions and preparation conditions for bread and paozu are shown in Tables 15 and 16, respectively.

TABLE 15

Composition and preparation conditions for bread

| Sponge Dough | Wheat flour | 70 parts |
|---|---|---|
|  | Yeast | 2 parts |
|  | Yeast food | 0.1 part |
|  | Water | 40 parts |
| Straight Dough | Wheat flour | 30 parts |
|  | Sugar | 5 parts |
|  | Salt | 2 parts |
|  | Shortening | 5 parts |
|  | Casein | 0.5 part |
|  | Water | 25 parts |
| Preparation conditions | Fermentation | 4 hours (temperature: 27° C.; humidity: 75%) |
|  | Drying | 40 minutes (temperature: 38° C.; humidity: 85%) |
|  | Baking | 35 minutes (temperature: 210° C.) |

TABLE 16

Composition and preparation conditions for paozu

| Composition | Wheat flour | 100 parts |
|---|---|---|
|  | Sugar | 15 parts |
|  | Salt | 0.8 part |
|  | Baking powder | 1 part |
|  | Lard | 5 parts |
|  | Yeast | 3.5 parts |
|  | Water | 43.5 parts |
| Preparation conditions | Drying | 90 minutes (temperature: 45° C.; humidity: 75%) |
|  | Steaming | 15 minutes |

1 g of the Agabiose was added to 100 g of the bread (Product 27) or the paozu (Product 28) when raw materials were mixed. 1 g of the Agaoligo was added to 100 g of the bread (Product 29) or the paozu (Product 30). Products without the addition of an agarobiose-containing composition were used as controls.

The thus-obtained bread and paozu were wrapped with Saran Wrap and allowed to stand at 5° C. for 24 hours, and then used to conduct sensory evaluation as described in Example 4. The results are shown in Table 17.

TABLE 17

Sensory evaluation

|  | Feeling on on tongue | | | Balance Amplitude | | | Texture | | | Total | | |
|---|---|---|---|---|---|---|---|---|---|---|---|---|
|  | P | | | P | | | P | | | P | | |
| Bread | 27 | 29 | C | 27 | 29 | C | 27 | 29 | C | 27 | 29 | C |
|  | 3.3 | 3.5 | 2.5 | 3.5 | 3.9 | 2.7 | 3.2 | 3.7 | 2.3 | 3.1 | 1.9 | 1.4 |
|  | P | | | P | | | P | | | P | | |
| Paozu | 28 | 30 | C | 28 | 30 | C | 28 | 30 | C | 28 | 30 | C |
|  | 3.0 | 3.5 | 2.3 | 3.4 | 3.7 | 2.6 | 3.2 | 3.4 | 2.1 | 3.2 | 3.5 | 2.3 |

P: the product of the present invention;
C: the control.

As shown in Table 17, each of the Products 27 and 29 (bread) and 28 and 30 (paozu) exhibited less dryness characteristic of bread, was more elastic, and conferred a smoother and more sticky feeling on the tongue and more excellent texture as compared with the corresponding control. Such properties could be retained.

Example 15

0.5 g of the Agabiose or the Agaoligo was added to 100 ml of sake prepared according to a conventional method to prepare Products 31 and 32. Sake without the addition of an agarobiose-containing composition was used as a control. Sensory evaluation was conducted as described in Example 4. The results are shown in Table 18.

TABLE 18

Sensory evaluation

|  | Product 31 | Product 32 | Control |
|---|---|---|---|
| Feeling on tongue |  |  |  |
| Mellowness | 3.5 | 3.8 | 2.7 |
| Smoothness | 3.7 | 4.0 | 2.8 |

TABLE 18-continued

| | Sensory evaluation | | |
|---|---|---|---|
| | Product 31 | Product 32 | Control |
| Taste | | | |
| Balance | 3.2 | 3.4 | 2.7 |
| Amplitude | 3.3 | 3.5 | 2.7 |
| Aftertaste | 3.4 | 3.5 | 2.7 |
| Flavor | 2.8 | 2.9 | 2.8 |
| Total | 3.4 | 3.6 | 2.8 |

As shown in Table 18, each of the Products 31 and 32 had a more excellent feeling on the tongue (in particular, smoothness), improved aftertaste, and a less stimulative feeling due to alcohol as compared with the control. Balance and amplitude of the taste were excellent, and effects of improving the taste as a luxury drink were observed.

Example 16

1 g of the Agabiose was added to 100 ml of sweet sake (Product 33) or a fermented seasoning (Product 34) prepared according to conventional methods. 1 g of the Agaoligo was added to 100 ml of the sweet sake (Product 35) or the fermented seasoning (Product 36). Products without the addition of an agarobiose-containing composition were used as controls.

Sensory evaluation was conducted as described in Example 4. The results are shown in Table 19.

TABLE 19

| | Sensory evaluation | | | | | |
|---|---|---|---|---|---|---|
| | Sweet sake | | | Fermented seasoning | | |
| | Product | | | Product | | |
| | 33 | 35 | Control | 34 | 36 | Control |
| Feeling on tongue | | | | | | |
| Mellowness | 3.1 | 3.7 | 2.7 | 3.1 | 3.6 | 2.6 |
| Smoothness | 3.8 | 4.1 | 3.0 | 3.5 | 3.8 | 2.8 |
| Taste | | | | | | |
| Balance | 3.4 | 3.2 | 3.0 | 3.0 | 2.6 | 2.4 |
| Aftertaste | 3.3 | 3.5 | 3.0 | 2.8 | 3.1 | 2.3 |
| Flavor | 2.8 | 2.7 | 2.6 | 2.7 | 2.7 | 2.5 |
| Total | 3.3 | 3.4 | 2.9 | 3.1 | 3.2 | 2.6 |

As shown in Table 19, each of the Products 33 and 35 (sweet sake), and 34 and 36 (fermented seasoning) had enhanced balance and amplitude of the taste and improved feeling on the tongue, in particular mellowness and smoothness, as compared with the corresponding control. Such properties as seasonings would improve the tastes of food materials upon cooking.

Example 17

A composite seasoning as a sauce for "yakitori" (barbecued chicken) was prepared by mixing 240 ml of water, 240 ml of normal sweet sake, 160 ml of normal soy sauce, 8 ml of sake, 54 g of sugar and 16 g of starch, further adding a small amount of water thereto and heating the mixture until it became thick due to the starch.

1 g of the Agaoligo was added to 100 ml of the composite seasoning to prepare a Product 37. A composite seasoning without the addition of the Agaoligo was used as a control.

Sensory evaluation was conducted as described in Example 4. The results are shown in Table 20.

TABLE 20

| | Sensory evaluation | |
|---|---|---|
| | Product 37 | Control |
| Taste | 3.5 | 3.0 |
| Maturity/harmony | 4.0 | 3.1 |
| Flavor | 3.0 | 2.8 |
| Appearance | 3.6 | 3.3 |
| Total | 3.5 | 3.1 |

As shown in Table 20, the Product 37 had remarkable properties for its quality such as good maturity, harmony and balance of the taste as compared with the control.

Example 18

A composite seasoning as a dipping sauce for thin wheat noodles was prepared by mixing 40 ml of normal sweet sake, 20 ml of dark-colored soy sauce, 20 ml of light-colored soy sauce and 200 ml of dried bonite stock prepared according to a conventional method.

1.4 g of the Agabiose was added to 100 ml of the composite seasoning to prepare a Product 38. A composite seasoning without the addition of the Agabiose was used as a control.

Sensory evaluation was conducted as described in Example 4. The results are shown in Table 21.

TABLE 21

| | Sensory evaluation | |
|---|---|---|
| | Product 38 | Control |
| Taste | 4.0 | 3.2 |
| Maturity/harmony | 4.2 | 3.2 |
| Flavor | 3.0 | 2.6 |
| Appearance | 3.2 | 3.1 |
| Total | 3.6 | 3.0 |

As shown in Table 21, the Product 38 was evaluated as having better amplitude and balance of the taste and flavor than the control.

Example 19

A composite seasoning as a "sanbaizu" (a mixture of vinegar, soy sauce and sweet sake) was prepared by mixing 40 ml of normal sweet sake, 100 ml of vinegar and 100 ml of soy sauce.

1.4 g of the Agaoligo was added to 100 ml of the composite seasoning to prepare a Product 39. A composite seasoning without the addition of the Agaoligo was used as a control.

Sensory evaluation was conducted as described in Example 4. The results are shown in Table 22.

TABLE 22

| | Sensory evaluation | |
|---|---|---|
| | Product 39 | Control |
| Taste | 3.8 | 3.0 |
| Maturity/harmony | 3.7 | 3.2 |
| Flavor | 3.2 | 3.0 |
| Appearance | 3.2 | 3.1 |
| Total | 3.5 | 3.0 |

As shown in Table 22, the taste of the vinegar was well harmonized with the tastes of other seasonings in the Product 39 as compared with the control. Effects on cooking similar to those accomplished by allowing to stand for a long time after mixing were recognized. Furthermore, the "sukado" (sharpness of an acid taste) and the "shiokado" (sharpness of a salty taste) were removed. Thus, a totally excellent composite seasoning was obtained.

Example 20

Vinegar-type and soy sauce-type seasonings (dressing-type seasonings) were experimentally produced. The compositions of Products 40 (vinegar-type) and 41 (soy sauce-type) are shown in Tables 23 and 24.

TABLE 23:

| Composition of dressing-type seasoning (the Product 40, vinegar-type) | |
|---|---|
| Citric acid decomposition product (prepared in Example 3) | 20.0% |
| Rice vinegar | 40.0% |
| Sake | 5.0% |
| "Namishio" (standard salt) | 6.0% |
| Saccharides | 4.0% |
| Acidulant | 0.5% |
| Thickening agent | — |
| Water | Remainder |

TABLE 24

| Composition of dressing-type seasoning (the Product 41, soy sauce-type) | |
|---|---|
| Agabiose | 2.0% |
| Rice vinegar | 12.5% |
| Soy sauce | 12.5% |
| Saccharides | 8.0% |
| Sake | 4.0% |
| "Namishio" (standard salt) | 4.0% |
| Acidulant | 0.7% |
| Amino acids etc. | 1.8% |
| Thickening agent | 0.05 |
| Water | Remainder |

Products without the addition of the citric acid decomposition product or the Agabiose were used as controls.

Sensory evaluation was conducted as described in Example 4. The results are shown in Table 25.

TABLE 25

| | Sensory evaluation | | | |
|---|---|---|---|---|
| | Vinegar-type | | Soy sauce-type | |
| | Product 40 | Control | Product 41 | Control |
| Taste | 3.6 | 3.0 | 3.8 | 3.1 |
| Maturity/harmony | 4.0 | 2.8 | 3.8 | 2.9 |

TABLE 25-continued

| | Sensory evaluation | | | |
|---|---|---|---|---|
| | Vinegar-type | | Soy sauce-type | |
| | Product 40 | Control | Product 41 | Control |
| Flavor | 3.2 | 3.1 | 3.3 | 3.1 |
| Appearance | 3.4 | 3.2 | 3.3 | 3.0 |
| Total | 3.6 | 3.0 | 3.6 | 3.0 |

As shown in Table 25, each of the Products 40 and 41 had a mild taste with the stimulus due to vinegar being abirritated, good balance and amplitude of the taste, a matured taste and reduced smell of vinegar, and left less aftertaste as compared with the corresponding control. Thus, the products of the present invention were dressing-type seasonings which can be conveniently used.

Example 21

A "furikake" (tastily seasoned dried food for sprinkling on rice) was prepared by mixing 4.7 kg of fish meal, 0.8 kg layer, 2.5 kg of sesame, 1.0 kg of salt and 0.5 kg of sodium glutamate, and granulating the mixture according to a conventional method.

50 g of the Agabiose or the Agaoligo was added to 100 g of the furikake to prepare Products 42 and 43. A furikake without the addition of an agarobiose-containing composition was used as a control. The furikake was sprinkled on boiled rice to conduct sensory evaluation as described in Example 4.

As a result, each of the Products 42 and 43 had a feeling matched well with rice upon eating, less "shiokado" (sharpness of a salty taste), an abirritated salty taste, a good feeling on the tongue and smoothened rough texture as compare with the control. Thus, the quality of furikake was demonstrated to be totally improved.

Example 22

As vinegar drinks, drinks containing "kurozu" (brewed rice vinegar) were experimentally produced. Products 44 and 47 (kurozu flavor), 45 and 48 (kurozu and ginger flavor) and 46 and 49 (kurozu and ginger flavor and whey mineral taste) were produced. The compositions of the respective drinks are shown in Tables 26 ad 27. The raw materials used were as follows: the product obtained by decomposing agar using citric acid as described in Example 3 (agar decomposition solution) or the Agaoligo, kurozu (Sakamoto Brewing), plum juice (Takasago International), muscat grape juice (Ogawa Koryo), sugar (Taito), sodium citrate (Iwata Chemical), whey mineral (Kyodo Milk), ginger essence (Takasago International), ginger flavor (San-Ei Gen F.F.I.) and vitamin C (Roche Vitamin Japan).

TABLE 26

| | Product 44 Kurozu flavor | Product 45 Kurozu/ginger flavor | Product 46 Kurozu/ginger flavor; whey mineral taste |
|---|---|---|---|
| Agar decomposition solution (%) | 5 | 5 | 5 |
| Kurozu (Sakamoto) (%) | 2.5 | 2.5 | 2.5 |
| 1/5 Plum juice (%) | 1.0 | 1.0 | 1.0 |

TABLE 26-continued

|  | Product 44 Kurozu flavor | Product 45 Kurozu/ginger flavor | Product 46 Kurozu/ginger flavor; whey mineral taste |
|---|---|---|---|
| Muscat grape juice (%) | 0.5 | 0.5 | 0.5 |
| Sugar (%) | 3 | 3 | 3 |
| Na-citrate for pH adjustment (%) | 0.04 | 0.04 | 0.04 |
| Whey mineral (%) | 0 | 0 | 0.05 |
| Ginger extract (%) | 0 | 0.007 | 0.01 |
| Ginger flavor (%) | 0 | 0.01 | 0.02 |
| pH | 3.3 | 3.3 | 3.3 |
| Brix | 4.6 | 4.6 | 4.6 |
| Acidity (%) (corresponding citric acid) | 0.36 | 0.36 | 0.36 |

TABLE 27

|  | Product 47 Kurozu flavor | Product 48 Kurozu/ginger flavor | Product 49 Kurozu/ginger flavor; whey mineral taste |
|---|---|---|---|
| Agaoligo (%) | 0.5 | 0.5 | 0.5 |
| Kurozu (Sakamoto) (%) | 2.5 | 2.5 | 2.5 |
| 1/5 Plum juice (%) | 1.0 | 1.0 | 1.0 |
| Muscat grape juice (%) | 0.5 | 0.5 | 0.5 |
| Sugar (%) | 3 | 3 | 3 |
| Na-citrate for pH adjustment (%) | 0.09 | 0.09 | 0.09 |
| Whey mineral (%) | 0 | 0 | 0.05 |
| Ginger extract (%) | 0 | 0.007 | 0.01 |
| Ginger flavor (%) | 0 | 0.01 | 0.02 |
| pH | 3.3 | 3.3 | 3.3 |
| Brix | 4.6 | 4.6 | 4.6 |
| Acidity (%) (corresponding citric acid) | 0.36 | 0.36 | 0.36 |

A drink with kurozu flavor, kurozu and ginger flavor, or kurozu and ginger flavor and whey mineral taste, without the addition of the agar decomposition solution or the Agaoligo and containing citric acid at a concentration of 0.05% in place of sodium citrate (Na-citrate) was used as a Control 1, 2 or 3.

Sensory evaluation was conducted as described in Example 4. The results are shown in Table 28.

TABLE 28

| Product | Agar decomposition solution | | | Agaoligo | | | Control | | |
|---|---|---|---|---|---|---|---|---|---|
| (Control) | 44 | 45 | 46 | 47 | 48 | 49 | 1 | 2 | 3 |
| Taste | 3.6 | 3.8 | 4.0 | 3.5 | 3.6 | 3.9 | 2.7 | 3.0 | 3.1 |
| Maturity/harmony | 3.7 | 4.0 | 4.3 | 3.5 | 3.8 | 4.2 | 2.5 | 2.6 | 2.8 |
| Flavor | 3.2 | 3.9 | 4.2 | 3.1 | 3.8 | 4.2 | 2.4 | 2.6 | 2.8 |
| Appearance | 3.4 | 3.5 | 3.5 | 3.4 | 3.5 | 3.5 | 3.3 | 3.3 | 3.4 |
| Total | 3.5 | 3.8 | 4.2 | 3.3 | 3.7 | 4.1 | 2.6 | 2.7 | 2.9 |

As shown in Table 28, the drinks containing kurozu as well as the agar decomposition solution or the Agaoligo of the present invention had abirritated stimulus due to vinegar as compared with the corresponding controls. It is generally reluctant to use vinegar for drinks because of its smell and pungent stimulus. However, kurozu was made easy to drink by adding the agar decomposition solution or the Agaoligo. Furthermore, each of the drinks was prepared to have good balance and amplitude of the taste, a matured taste, refreshingness, as well as moderate deliciousness and acid taste of kurozu. Additionally, both of ginger and whey mineral matched with the taste of kurozu with good balance, and had tendency to make the products easier to drink.

Example 23

As a sweet, candy having the composition as shown in Table 29 was experimentally produced.

TABLE 29

| Composition | |
|---|---|
| Reduced starch syrup | 1 kg |
| Agaoligo | 26.4 g |
| Acidulant | 12 g |
| Granular plum | 10 g |
| Flavor (plum) | 1.6 g |
| Salt | 1 g |
| Natural coloring matter | 0.4 g |

A Product 50 was prepared by adding water to reduced starch syrup, dissolving using a dissolver, boiling the solution using a cooker at 120 to 130° C. to make the water content become 2% or less, and adding thereto the Agaoligo, acidulant, granular plum, flavor (plum), salt and natural coloring matter while cooling. Candy without the addition of the Agaoligo was used as a control. Sensory evaluation was conducted as described in Example 4. The results are shown in Table 30.

TABLE 30

| | Sensory evaluation | | | |
|---|---|---|---|---|
| | Feeling on tongue | Balance Amplitude | Texture | Total |
| Product 50 | 4.4 | 4.5 | 4.3 | 4.0 |
| Control | 2.5 | 2.8 | 2.5 | 2.6 |

As shown in Table 30, the Product 50 had an improved smooth feeling on the tongue, improved balance of the taste, an abirritated acid taste and a totally mild taste as compared with the control. It was totally evaluated as being excellent.

Example 24

The concentration of raw material agar was examined. Agar having low jelly strength (Ultra Agar AX-30, Ina Shokuhin Kogyo) as a raw material agar (viscous material) was added as indicated in the composition table, Table 31.

TABLE 31

| | Composition |
|---|---|
| Material | Content |
| Ultra Agar AX-30 (%) | 0.01, 0.1 0.25, 0.5, 1.0 |
| Sugar (%) | 6.6 |
| 1/7 Grapefruit juice (%) | 0.15 |
| Citric acid (%) | 0.08 |
| Sodium citrate (%) | 0.05 |
| Flavor (grapefruit) (%) | 0.1 |
| pH | 3.7 |

TABLE 31-continued

| Composition | |
| --- | --- |
| Material | Content |
| Brix | 7.2 |
| Acidity (%) (corresponding citric acid) | 0.1 |

A drink containing a liquid agar was prepared as follows. Ultra Agar was dissolved in warm water (85 to 90° C.) at a concentration twice the final one for 15 minutes (generally for 10 minutes or longer). Sugar, ½ grapefruit juice, citric acid and sodium citrate were then added to the solution. After the mixture was cooled to 60° C., flavor was added thereto. The mixture was homogenized, and deionized water was further added to adjust the agar concentration to the predetermined one.

The resulting mixture was sterilized by heating at 95° C. for 1 minute. A 200-ml can was filled with 190 g of the mixture. For the Control (1), the mixture was cooled to room temperature (25° C.) by allowing the canned product to stand at room temperature. For the product of the present invention, the mixture was cooled to room temperature (25° C.) by forcibly stirring the canned product for 30 minutes in a horizontal and reciprocal manner using a shaker (amplitude of 3 cm, 60 lateral vibration per minute) while cooling it from 50° C. to room temperature. For the Control (2), the mixture was cooled to room temperature (25° C.) in the same manner as that described for the Control (1), and the canned product was then forcibly stirred as described above for the product of the present invention. General analyses and sensory evaluation (at 5 to 10° C.) were conducted using the thus-obtained products. The sensory evaluation was conducted by a panel consisting of 10 members using five grades (1: good; 5: bad). The results are shown in Table 32.

containing the raw material agar at a concentration of 0.01 or more and less than 1.0% (w/v) was evaluated as being excellent at thickness, aftertaste and feeling upon passage through one's throat. The product of the present invention was evaluated as being good for all of the three factors, i.e., thickness, aftertaste and feeling upon passage through one's throat, as compared with the Controls (1) and (2). The Control (1) was evaluated as leaving significant aftertaste and having insufficient feeling upon passage through one's throat. The Control (2) was evaluated as being insufficient for aftertaste and feeling upon passage through one's throat. Thus, it was demonstrated that the product of the present invention had improved sensory flow properties, in particular.

A 200-ml pouch with spout instead of a can was filled with 180 g of the heat-sterilized mixture. The product was treated as described above for a canned product. As a result, sensory evaluation and stability similar to those observed for the canned product were obtained.

Next, the conditions for forcible stirring were examined. A drink having the composition as shown in Table 31 in which the raw material agar concentration was 0.25% (w/v) was used. A 200-ml can filled with the drink containing a liquid agar was cooled from 50° C. or above to room temperature while shaking the canned product for 3, 10, 30 or 60 minutes in a horizontal and reciprocal manner at 15, 60 or 120 lateral vibration per minute, optionally using cold air or cold water (5° C.).

As a result, all of the drinks treated under the various conditions as described above were evaluated as being almost equivalent to the above-mentioned drink having the composition as shown in Table 31 in which the raw material agar concentration was 0.25% (w/v). Thus, it was demonstrated that forcible stirring is preferably conducted for 3 to 60 minutes at 15 to 120 lateral vibration per minute.

Furthermore, the change in the properties was examined over time by allowing the drink containing a liquid agar

TABLE 32

Changing temperature across solidifying point temperature of raw material agar while forcibly stirring

| | Product | | | | Control (2) | | | | Control (1) | | | |
| --- | --- | --- | --- | --- | --- | --- | --- | --- | --- | --- | --- | --- |
| | | Sensory evaluation | | | | Sensory evaluation | | | | Sensory evaluation | | |
| Ultra Agar (% w/v) | Viscosity (cps) | T | A | F | Viscosity (cps) | T | A | F | Viscosity (cps) | T | A | F |
| 0.01 | 2 | ⊚ | ⊚ | ⊚ | 3 | ⊚ | ∇ | ○ | 4 | ⊚ | X | ○ |
| 0.1 | 16 | ⊚ | ⊚ | ⊚ | 18 | ⊚ | ∇ | ○ | 22 | ⊚ | X | ○ |
| 0.25 | 52 | ⊚ | ⊚ | ⊚ | 57 | ⊚ | ∇ | ○ | 61 | ⊚ | X | ○ |
| 0.5 | 163 | ⊚ | ⊚ | ⊚ | 180 | ⊚ | ∇ | ○ | 206 | ⊚ | X | ○ |
| 1.0 | Jelli-fied | ∇ | ∇ | ∇ | Jelli-fied | X | X | X | Jelli-fied | X | X | X |

T: thickness;
A: aftertaste;
F: feeling upon passage through one's throat. Measured using B-type viscometer (BM type, Tokimec) at 30 lateral vibration per minute at 20° C.
⊚: very good (from 1 to 2);
○: good (more than 2, 3 or less);
∇: slightly good (more than 3, 4 or less);
X: bad (more than 4, 5 or less).

As shown in Table 32, according to the sensory evaluation for the fluidity of a drink containing the raw material agar at a concentration ranging from 0.01 to 1.0% (w/v), the drink forcibly stirred by shaking at 60 lateral vibration per minute (the product of the present invention), the Control (1) and the Control (2) to stand at 30° C. for 1, 3, 6 or 9 month(s).

TABLE 33

| | Change in properties over time | | | | | | | | | | | |
|---|---|---|---|---|---|---|---|---|---|---|---|---|
| | Product | | | | Control (2) | | | | Control (1) | | | |
| Time | | Sensory evaluation | | | | Sensory evaluation | | | | Sensory evaluation | | |
| (month) | Viscosity (cps) | T | A | F | Viscosity (cps) | T | A | F | Viscosity (cps) | T | A | F |
| Start | 52 | ⊚ | ⊚ | ⊚ | 57 | ⊚ | V | ○ | 61 | ⊚ | X | ○ |
| 1 | 52 | ⊚ | ⊚ | ⊚ | 52 | ⊚ | V | ○ | 50 | ⊚ | X | ○ |
| 3 | 52 | ⊚ | ⊚ | ⊚ | 51 | ⊚ | V | ○ | 46 | ○ | X | ○ |
| 6 | 51 | ⊚ | ⊚ | ⊚ | 47 | ⊚ | V | ○ | 44 | ○ | X | ○ |
| 9 | 49 | ⊚ | ⊚ | ⊚ | 46 | ○ | V | ○ | 41 | ○ | X | ○ |

T: thickness;
A: aftertaste;
F: feeling upon passage through one's throat.
⊚: very good (from 1 to 2);
○: good (more than 2, 3 or less);
V: slightly good (more than 3, 4 or less);
X: bad (more than 4, 5 or less).

As shown in Table 33, the product of the present invention was evaluated as being very good for thickness, aftertaste and feeling upon passage through one's throat still after standing for 9 months. The decrease in viscosity was reduced. For the Control (1), the degree of decrease in viscosity was relatively great, and the thickness became insufficient after standing for six months or longer. For the Control (2), the thickness became insufficient after standing for 9 months. Thus, it was demonstrated that the sensory flow properties including thickness, aftertaste and feeling upon passage through one's throat of the product of the present invention were stable, and the forcible stirring were remarkably effective. These results suggest the following. Macromolecules constituting agar contain sulfate groups, and thus they are considered to be electrolytic substances. The steric structures of the macromolecules are altered upon changing the temperature across the solidifying point temperature while forcible stirring the dissolved raw material agar. As a result, stable sol is formed. However, if the agar is allowed to stand, the steric alteration may become insufficient, resulting in unstable sol which is changeable over time. It is considered that the above-mentioned events significantly contribute the improved sensory flow properties accomplished by the forcible stirring, as well as the flow properties stabilized over time. Furthermore, if a powdery material co-exists, it is considered that stable sol is formed including the material, and the rough or powdery texture due to the material is then reduced. Furthermore, the existence of the powdery material may promote the inclusion and retention of flavor in the sol and emission of the flavor in one's mouth.

Example 25

A drink with pear flavor and taste containing a liquid agar and having improved fluidity was prepared. The composition and results of general analyses are shown in Table 34.

TABLE 34

Drink with pear flavor and taste containing liquid agar and having improved fluidity

| Material | Content |
|---|---|
| Ultra Agar AX-30 (%) | 0.3 |
| Sugar (%) | 6.6 |
| 1/6 Concentrated pear juice (%) | 0.2 |
| Sodium ascorbate (%) | 0.01 |
| Flavor (pear) (%) | 0.1 |
| pH | 4.5 |
| Brix | 7.2 |
| Acidity (%) (corresponding citric acid) | 0.09 |
| Viscosity (cps) | 70 |

The materials as shown in Table 34 were used to produce a canned product containing 190 g of the drink according to the preparation method as described in Example 24. The product of the present invention was sterilized at 115° C. for 17 minutes. The product was then cooled from 50° C. while shaking and stirring in a horizontal and reciprocal manner (amplitude of 3 cm, 60 lateral vibration per minute). A product prepared by allowing the above-mentioned canned product to stand was used as a control.

According to the sensory evaluation of the thus-obtained products, the product of the present invention was evaluated as having good sensory flow properties including thickness, aftertaste and feeling upon passage through one's throat, and being more excellent than the control. The sensory flow properties were stably maintained for a long time as observed in Example 24.

A 200-ml pouch with spout instead of a can was filled with 180 g of the drink as described in Example 24. The product was sterilized at 85° C. for 10 minutes and treated as described above for a canned product. The sensory evaluation and stability were similar to those observed for the canned product.

Example 26

A drink with brown sugar flavor containing a liquid agar and having improved fluidity was prepared. The composition and results of general analyses are shown in Table 35.

TABLE 35

Drink with brown sugar flavor and taste containing liquid agar and having improved fluidity

| Material | Content |
| --- | --- |
| Ultra Agar AX-30 (%) | 0.3 |
| Sugar (%) | 6.0 |
| Sodium ascorbate (%) | 0.01 |
| Flavor (%) | 0.2 |
| pH | 5.6 |
| Brix | 6.5 |
| Acidity (%) (corresponding citric acid) | 0.03 |
| Viscosity (cps) | 67 |

The materials as shown in Table 35 were used to produce a canned product containing 190 g of the drink according to the preparation method as described in Example 24. The product was sterilized at 115° C. for 17 minutes. The product of the present invention and a control were prepared as described in Example 25.

According to the sensory evaluation of the thus-obtained products, the product of the present invention was evaluated as having good sensory flow properties including thickness, aftertaste and feeling upon passage through one's throat, and being more excellent than the control. The sensory flow properties were stably maintained for a long time as observed in Example 24.

A 200-ml pouch with spout instead of a can was filled with 180 g of the drink as described in Example 24. The product was sterilized at 85° C. for 10 minutes and treated as described above for a canned product. The sensory evaluation and stability were similar to those observed for the canned product.

Example 27

A drink with cocoa flavor and taste containing a liquid agar and having improved fluidity was prepared.

TABLE 36

Drink with cocoa flavor and taste containing liquid agar and having improved fluidity

| Material | Content |
| --- | --- |
| Ultra Agar AX-30 (%) | 0.25 |
| Cocoa powder (%) | 1.0 |
| Sugar (%) | 6.6 |
| Sodium citrate (%) | 0.05 |
| Vitamin C (%) | 0.02 |
| Clouding agent (%) | 0.05 |
| Flavor (%) | 0.1 |
| pH | 3.8 |
| Brix | 7.0 |
| Acidity (%) (corresponding citric acid) | 0.23 |
| Viscosity (cps) | 70 |

The materials as shown in Table 36 were used to produce a canned product containing 190 g of the drink according to the preparation method as described in Example 24. The product was sterilized at 115° C. for 17 minutes. The product of the present invention and a control were prepared as described in Example 25.

According to the sensory evaluation of the thus-obtained products, the product of the present invention had flow properties well balanced with the viscosity due to the cocoa. The product of the present invention was evaluated as having good sensory flow properties including thickness, aftertaste and feeling upon passage through one's throat, and being more excellent than the control. The sensory flow properties were stably maintained for a long time as observed in Example 25. As compared with the control, the mild feeling on the tongue due to the cocoa in the product of the present invention was increased.

A 200-ml pouch with spout instead of a can was filled with 180 g of the drink as described in Example 24. The product was sterilized at 85° C. for 10 minutes and treated as described above for a canned product. The sensory evaluation and stability were similar to those observed for the canned product.

Example 8

A drink with mugwort flavor and taste containing a liquid agar and having improved fluidity was prepared.

TABLE 37

Drink with mugwort flavor and taste containing liquid agar and having improved fluidity

| Material | Content |
| --- | --- |
| Mugwort flavor (%) | 0.5 |
| Ultra Agar AX-30 (%) | 0.3 |
| Grapefruit juice (%) | 1.0 |
| Sugar (%) | 6.6 |
| Sodium citrate (%) | 0.05 |
| Vitamin C (%) | 0.08 |
| Flavor (%) | 0.1 |
| Clouding agent | 0.1 |
| pH | 4.0 |
| Brix | 7.4 |
| Acidity (%) (corresponding citric acid) | 0.14 |
| Viscosity (cps) | 95 |

The materials as shown in Table 37 were used to produce a canned product containing 190 g of the drink according to the preparation method as described in Example 24. The product was sterilized at 115° C. for 17 minutes. The product of the present invention and a control were prepared as described in Example 25.

According to the sensory evaluation of the thus-obtained products, the product of the present invention was evaluated as having reduced rough texture due to mugwort and mugwort smell being made mild as compared with the control. Since much flavor was emitted in one's mouth, the flavor in the mouth was felt to be enriched. Thus, it was demonstrated that the product of the present invention was excellent in that the rough texture due to the material was reduced, and much flavor was retained and emitted in one's mouth as compared with the control. Furthermore, the product of the present invention was evaluated as having good sensory flow properties including thickness, aftertaste and feeling upon passage through one's throat, and being more excellent than the control. The sensory flow properties were stably maintained for a long time as observed in Example 24.

A 200-ml pouch with spout instead of a can was filled with 180 g of the drink as described in Example 24. The product was sterilized at 85° C. for 10 minutes and treated as described above for a canned product. The sensory evaluation and stability were similar to those observed for the canned product.

Example 9

A drink with powdered green tea flavor and taste containing a liquid agar and having improved fluidity was prepared.

TABLE 38

Drink with powdered green tea flavor and taste containing liquid agar and having improved fluidity

| Material | Content |
| --- | --- |
| Green tea powder (%) | 0.5 |
| Ultra Agar AX-30 (%) | 0.3 |
| Grapefruit juice (%) | 1.0 |
| Sugar (%) | 6.6 |
| Sodium citrate (%) | 0.05 |
| Vitamin C (%) | 0.08 |
| Clouding agent | 0.1 |
| pH | 4.0 |
| Brix | 7.4 |
| Acidity (%) (corresponding citric acid) | 0.13 |
| Viscosity (cps) | 90 |

The materials as shown in Table 38 were used to produce a canned product containing 190 g of the drink according to the preparation method as described in Example 24. The product was sterilized at 115° C. for 17 minutes. The product of the present invention and a control were prepared as described in Example 25.

According to the sensory evaluation of the thus-obtained products, the product of the present invention was evaluated as having reduced powdery texture due to powdered green tea and bitter taste of tea being made mild as compared with the control. Since much powdered green tea flavor was emitted in one's mouth, the flavor in the mouth was felt to be enriched. Thus, it was demonstrated that the product of the present invention was excellent in that the powdery feeling due to the material was reduced, and much flavor was retained and emitted in one's mouth as compared with the control. Furthermore, the product of the present invention was evaluated as having good sensory flow properties including thickness, aftertaste and feeling upon passage through one's throat, and being more excellent than the control. The sensory flow properties were stably maintained for a long time as observed in Example 24.

A 200-ml pouch with spout instead of a can was filled with 180 g of the drink as described in Example 24. The product was sterilized at 85° C. for 10 minutes and treated as described above for a canned product. The sensory evaluation and stability were similar to those observed for the canned product.

INDUSTRIAL APPLICABILITY

The agarobiose and/or the agarobiose-containing composition obtained according to the present invention as a food material contains less by-products and has a higher purity than that obtained according to a decomposition method using a liquid acid. The equipment is not corroded in the production method. The production control and purification of the product are easy.

The food, drink or seasoning containing agarobiose and/or an agarobiose-containing composition of the present invention is very useful and novel for the following reasons. The inherent physical properties of the food, drink or seasoning are not spoiled. The stimulative taste is abirritated and/or the amplitude of the sweet taste is enhanced. The texture, aftertaste, and maturity and balance of the taste are improved. The physical properties that result in good texture can be retained.

The present invention provides a formulation for abirritating a stimulative taste and a formulation for enhancing amplitude of a sweet taste. These formulations are useful as food additives for the production of various food, drinks or seasonings. The present invention also provides a method for abirritating a stimulative taste and a method for enhancing amplitude of a sweet taste in which the formulations are used. These methods can be used to produce a food, drink or seasoning having a novel taste.

Furthermore, a novel drink containing a liquid agar is obtained according to the present invention. The drinks have the following properties. It has excellent sensory flow properties including thick texture, little aftertaste and a good feeling upon passage through one's throat. Its fluidity is improved. The rough or powdery texture due to the added materials is reduced. It has an excellent ability to emit flavor in one's mouth. In addition, the stabilization of quality can be achieved because the sensory properties are retained for over time. Thus, the present invention provides a highly useful drink containing a liquid agar and a method for producing the drink.

The invention claimed is:

1. A method for producing a non-gelable agarobiose-containing composition which contains 5 to 60% (w/w) of agarobiose and 40 to 95% (w/w) of at least one agarooligosaccharide other than agarobiose, the method comprising:
    a. preparing a mixture containing an agarobiose-containing material of agar or purified agarose and 0.1 to 50% (w/w) of a solid acid;
    b. decomposing the agarobiose-containing material by incubating the mixture at 50–100° C. for 30 minutes to 12 hours; and
    c. recovering an agarobiose-containing composition from the decomposition product;
    said method being further characterized in that said agaroboise containing composition, when solubilized in water to provide a solution, will not gelate even if the solution is cooled to its solidifying point.

2. The method according to claim 1, wherein the solid acid is a substance that has a functional group that results in a cation, and is capable of hydrolyzing in a solid form in a reaction mixture.

* * * * *